United States Patent [19]

McGee

[11] 4,132,427
[45] Jan. 2, 1979

[54] ANIMAL CARCASS TRANSPORTING DEVICE

[76] Inventor: James R. McGee, 5 Porter Pl., Towanda, Pa. 18848

[21] Appl. No.: 856,623

[22] Filed: Dec. 2, 1977

[51] Int. Cl.² .......................................... B62b 15/00
[52] U.S. Cl. ................................................ 280/19
[58] Field of Search .................... 280/19, 18, 15, 12 R

[56] References Cited

U.S. PATENT DOCUMENTS

| 999,391 | 8/1911 | Wentworth | 280/15 |
| 3,771,808 | 11/1973 | Duerst | 280/19 |
| 3,912,290 | 10/1975 | Rich | 280/19 |

Primary Examiner—Robert R. Song
Attorney, Agent, or Firm—Daniel Jay Tick

[57] ABSTRACT

A frame sled has straps affixed to members thereof for releasably securing an animal carcass to the sled. Pulling straps affixed to the sled at the front thereof facilitate pulling of the sled.

1 Claim, 4 Drawing Figures

ANIMAL CARCASS TRANSPORTING DEVICE

BACKGROUND OF THE INVENTION

The present invention relates to an animal carcass transporting device.

Animal carcass transporting devices are disclosed in U.S. Pat. Nos. 1,409,702; 2,592,771; 2,629,608; 2,893,748; 2,931,629 and 2,979,338.

Objects of the invention are to provide an animal carcass transporting device of simple structure, which is inexpensive in manufacture, light in weight, transported with convenience and facility, and functions efficiently, effectively and reliably to permit the transporting of an animal carcass such as, for example, a newly slaughtered deer, or the like, from the site at which it fell, out of the woods, to motorized transport.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
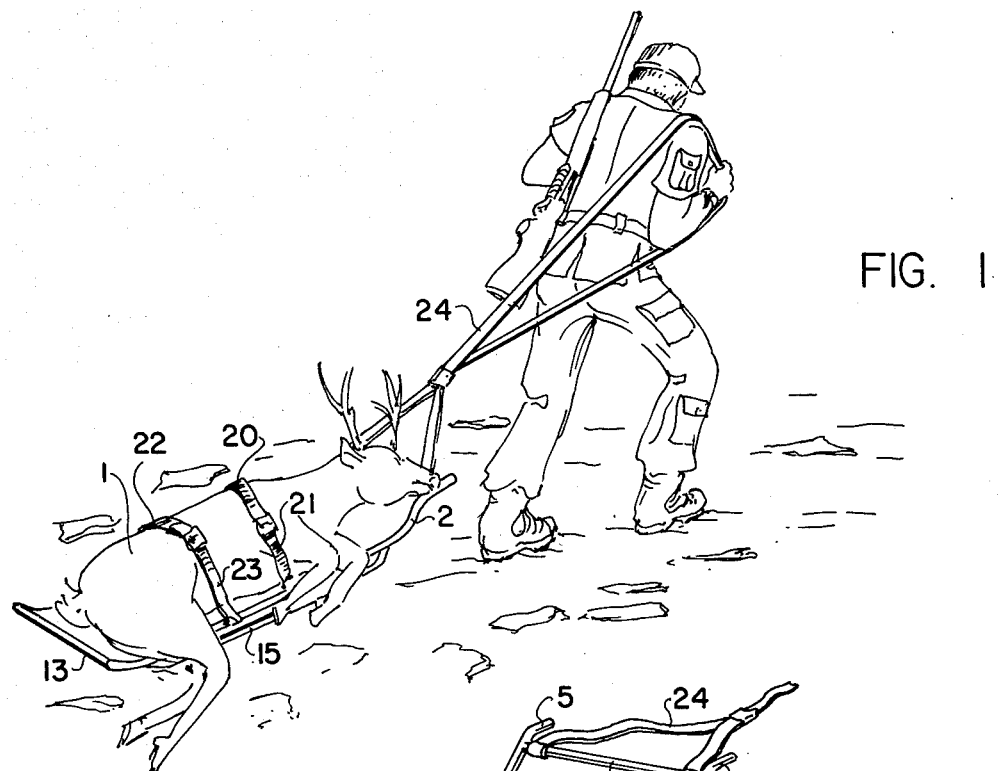
FIG. 1 is a perspective view of an embodiment of the animal carcass transporting device of the invention in use.
Figure 2:
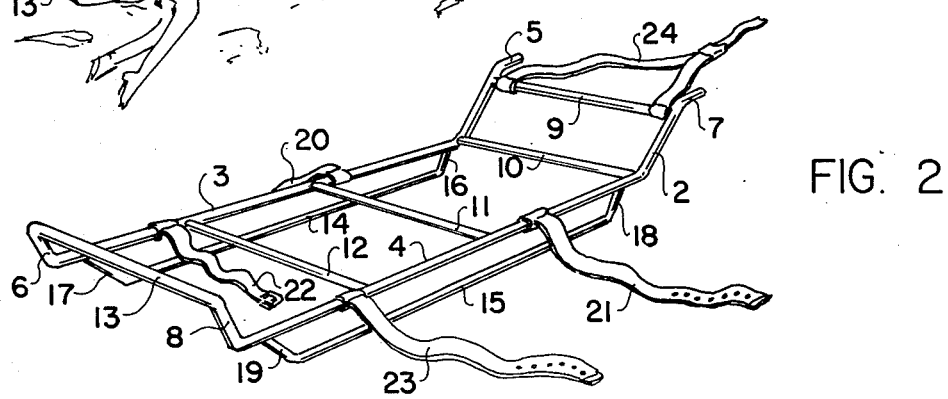
FIG. 2 is a perspective view, on an enlarged scale, of an embodiment of the animal carcass transporting device of the invention.
Figure 4:
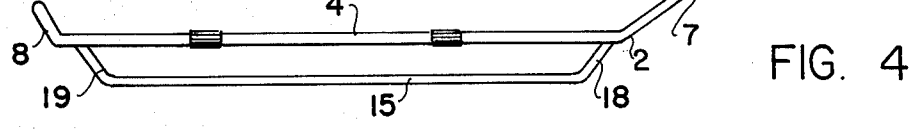
FIG. 4 is a side view, taken along the lines IV—IV, of FIG. 3.

The animal carcass transporting device of the invention is for transporting an animal carcass 1, shown in FIG. 1. The animal carcass transporting device of the invention comprises a sled 2 having a pair of elongated substantially linear first and second frame members 3 and 4 having spaced opposite first and second ends 5 and 6, and 7 and 8, respectively, as shown in FIG. 2. Each of the first and second frame members 3 and 4 is bent at an angle to itself at its first and second ends 5 and 6, and 7 and 8, respectively, as shown in FIGS. 2 and 4. The first and second frame members 3 and 4 constitute the sides of the sled.

Figure 3:
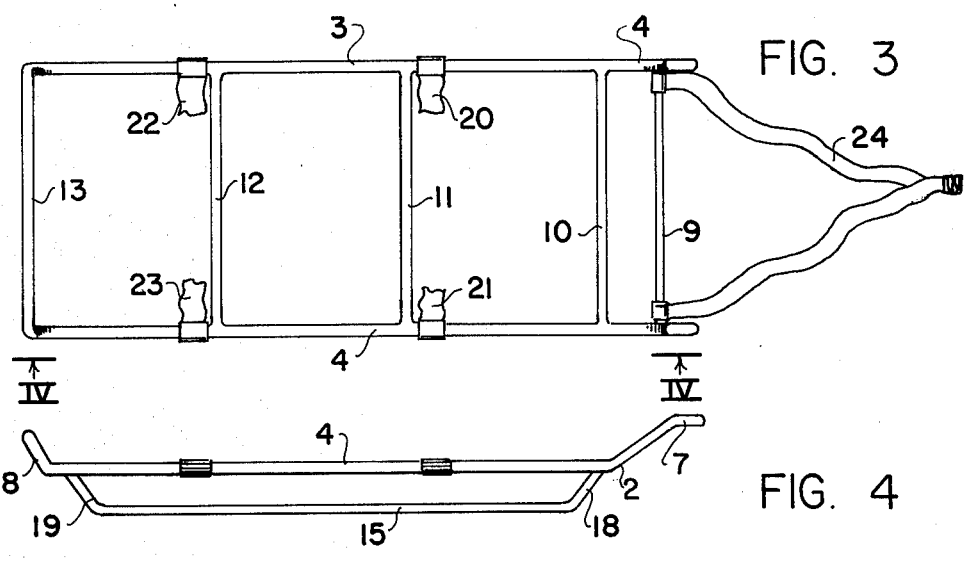
FIG. 3 is a top plan view, on an enlarged scale, of the embodiment of FIG. 2.

A plurality of spaced substantially parallel cross frame members 9, 10, 11, 12 and 13 (FIGS. 2 and 3) are affixed to the first and second frame members 3 and 4 and extend substantially perpendicularly thereto and support said first and second frame members in spaced substantially parallel relation.

First and second runner members 14 and 15 (FIG. 2) have spaced opposite first and second ends 16 and 17, and 18 and 19, respectively. Each of the first and second runner members 14 and 15 is bent at an angle to itself at its first and second ends 16 and 17, and 18 and 19, respectively. The first runner member 14 is affixed at its first and second ends 16 and 17 to the first frame member 3 and extends beneath said first frame member. The second runner member 15 is affixed at its first and second ends 18 and 19 to the second frame member 4 and extends beneath said second frame member.

A first pair of straps 20 and 21 are affixed to the first and second frame members 3 and 4, respectively, and are coupleable to each other for releasably securing an animal carcass 1 to the sled. A second pair of straps 22 and 23 are affixed to the first and second frame members 3 and 4, respectively, in spaced relation with the first pair of straps 20 and 21 and are coupleable to each other for releasably securing the animal carcass 1 to the sled. Both pairs of straps are shown coupled to each other and securing the animal carcass 1 to the sled in FIG. 1. Both pairs of straps are shown separated or uncoupled in FIG. 2.

Pulling straps 24 (FIGS. 1 to 3) are affixed to the cross frame member 9 of the sled 2 adjacent the first ends 5 and 7 of the first and second frame members 3 and 4, respectively, to facilitate the pulling of the sled, as shown in FIG. 1.

While the invention has been described by means of a specific example and in a specific embodiment, I do not wish to be limited thereto, for obvious modifications will occur to those skilled in the art without departing from the spirit and scope of the invention.

I claim:

1. An animal carcass transporting device for transporting an animal carcass, said animal carcass transporting device comprising a sled having a pair of elongated substantially linear first and second frame members having spaced opposite first and second ends, each bent upwardly at an angle to itself at its first and second ends, said first and second frame members constituting the sides of the sled, a plurality of spaced substantially parallel cross frame members affixed to the first and second frame members and extending substantially perpendicularly thereto and supporting said first and second frame members in spaced substantially parallel relation, and first and second runner members having spaced opposite first and second ends, each bent upwardly at an angle to itself at its first and second ends, the first and second runner members being affixed at their first and second ends to the first and second frame members, respectively, and extending beneath said first and second frame members;

a first pair of straps affixed to the first and second frame members and coupleable to each other for releasably securing an animal carcass to the sled;

a second pair of straps affixed to the first and second frame members in spaced relation with the first pair of straps and coupleable to each other for releasably securing the animal carcass to the sled; and pulling strap means affixed to a cross frame member adjacent the first ends of the first and second frame members for facilitating pulling of the sled.

* * * * *